Figure 1:
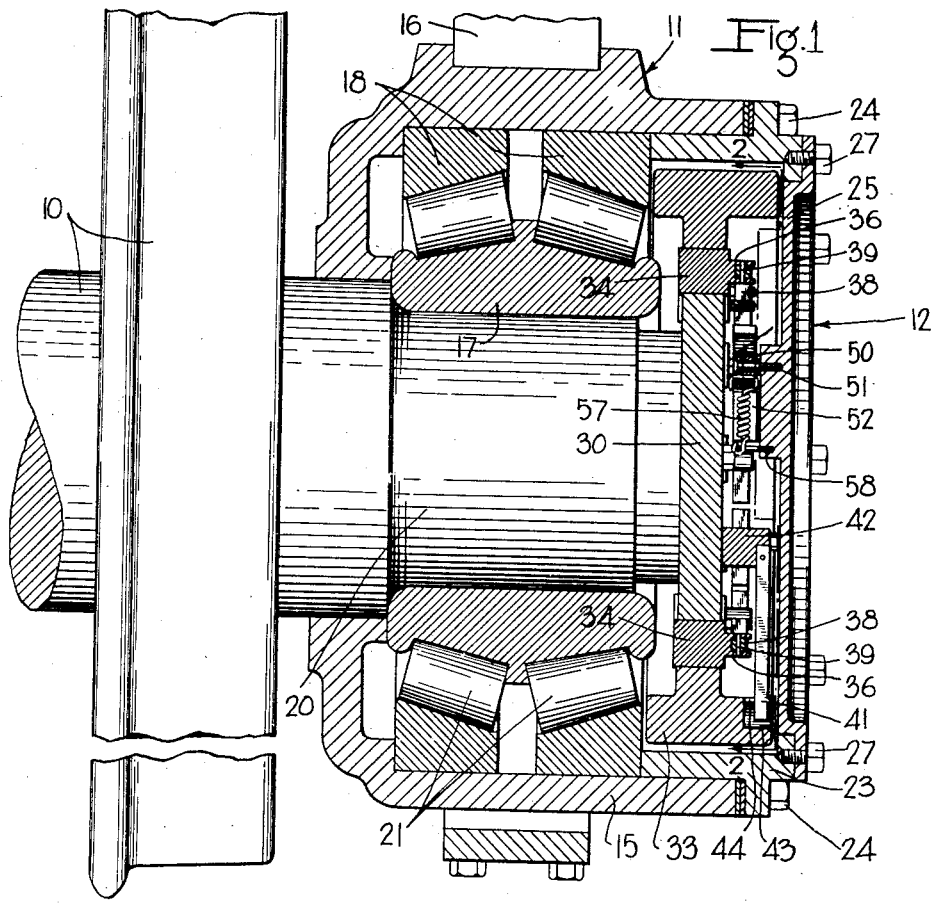

Sept. 1, 1942.   G. K. NEWELL   2,294,605
ROTARY INERTIA CONTROL DEVICE
Filed Feb. 28, 1941

INVENTOR
GEORGE K. NEWELL
BY
ATTORNEY

Patented Sept. 1, 1942

2,294,605

UNITED STATES PATENT OFFICE 2,294,605

ROTARY INERTIA CONTROL DEVICE

George K. Newell, near Pitcairn, Pa., assignor to The Westinghouse Air Brake Company, Wilmerding, Pa., a corporation of Pennsylvania Application February 28, 1941, Serial No. 381,047

15 Claims. (Cl. 200—52)

This invention relates to rotary inertia responsive control devices, and more particularly to a rotary inertia device designed to respond to the acceleration or deceleration of a vehicle wheel or axle for controlling the vehicle brakes, sanding apparatus, and the like.

The development of modern high speed railway trains has made necessary the designing of highly sensitive electropneumatic brake equipments, which must to a large extent be automatically controlled in order that the brakes can be operated to provide the greatest possible rate of deceleration of a train without causing damage or excessive wear of operating elements, such as car wheels. It has accordingly been proposed to provide control means adapted to respond to slipping of a vehicle wheel, or in other words to an initial retardation of the wheel at a rate in excess of that of the vehicle, for causing sanding of the rails or release of the associated brakes in time to prevent locking and sliding of the wheel. Various forms of such control means have been invented, one particularly successful type thereof comprising an annular inertia member or flywheel which is normally driven at a speed corresponding to that of a vehicle wheel, and which shifts yieldingly with respect to the driving element when the associated wheel begins to slip on the rail, the inertia element being operative when so displaced to cause the necessary sanding and release of the brakes. An example of the above type of control means is disclosed in the U. S. Patent No. 2,223,114 issued to Joseph C. McCune on February 10, 1939.

With a brake and sanding control equipment of the type just referred to, the automatic control of the brakes and sanders is preferably established by electrical means requiring circuit closing contacts, and to provide this feature it has heretofore been necessary to include sliding contacts and slip rings in the rotary inertia device, or else to add switch actuator means mechanically engaging the inertia responsive member.

A principal object of the present invention is to provide a rotary inertia responsive control device operative in accordance with the direction of rotation thereof to govern the opening and closing of suitable electrical contacts means, and comprising an inertia element constructed and arranged to cooperate with a circuit control mechanism solely through the medium of magnetic force.

Another object of the invention is to provide an acceleration or deceleration control apparatus including a rotary driving element, a freely mounted inertia responsive driven element, a movable circuit control element adapted to react selectively to magnetic forces, and means responsive to a change in the relative speed of the driving and driven elements for imposing a magnetic field on the control element corresponding to the direction of rotation.

Another object of the invention is to provide a rotary inertia device having the above mentioned advantages, and which is in addition so constructed and arranged as to effect positive and quick operation of the associated circuit controlling element in response to a predetermined variation in the relative rates of deceleration of the driving element and the inertia responsive element.

It is a still further object of the invention to provide an improved rotary inertia device which is simple and compact in design and which may be readily mounted in a convenient position on a railway vehicle truck, or on a journal box at the outer end of an axle.

Figure 2:
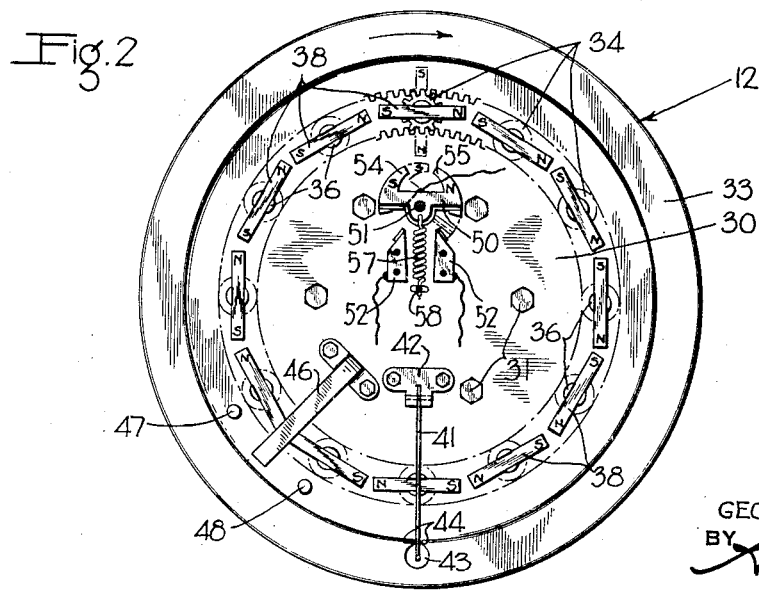

Other objects and advantages of the invention will appear in the following more detailed description thereof, taken in connection with the accompanying drawing, wherein, Fig. 1 is a fragmentary elevational view, partly in section, of one wheel and the adjacent end of an axle of a railway vehicle, with which is associated a journal assembly and a rotary inertia device constructed in accordance with my invention; and Fig. 2 is a plan view of the operating elements of the rotary inertia device taken substantially along the line 2—2 of Fig. 1.

As shown in Fig. 1 of the drawing, there is illustrated one type of equipment with which my improved inertia device may be associated, including a railway vehicle wheel and axle assembly 10, a journal box assembly 11 carried by the wheel and axle assembly, and a rotary inertia device 12, which in the present embodiment is disclosed as built into and supported by the journal box assembly. It will be understood that the wheel and axle assembly 10 may be of the usual construction and may form a part of a railway truck equipped with air brakes, the details of which are not shown. The journal box assembly 11 in the form illustrated is of the roller bearing type and includes a casing structure 15 disposed in supporting relation with other elements of the vehicle truck, such as the element 16. Inner and outer bearing races 17 and 18 are interposed between the interior wall of the casing structure 15 and the journal portion 20 of the axle, and are suitably fitted with a plurality of roller bearings 21. The other end of the cylindrical casing structure 15 preferably extends a short distance beyond the bearing portion 20 of the axle and is adapted to receive an annular flange member 23, which is suitably secured to the casing structure by a plurality of bolts 24. A circular cover plate 25 is provided for closing the outer end of the annular member 23, which elements are thus adapted to constitute a housing for the rotary inertia device about to be described. The cover plate 25 may be held in place by a plurality of bolts 27.

According to the invention as disclosed in Figs. 1 and 2, the rotary inertia device 12 includes a centrally disposed driving element or gear element 30, which is secured by means of bolts 31 or other suitable means to the end of axle bearing portion 20 of the axle 10, and which is adapted to support an annular inertia responsive driven element 33 through the medium of a plurality of planetary pinion elements 34. Each of the pinion elements 34 is interposed between the gear element 30 and the annular inertia element 33, and has suitable gear teeth engaging similar teeth formed on the gear element and on the inner surface of the annular inertia member. The pinion elements 34 are preferably disposed at equidistant points along the circumference of the gear member 30, and are, along with the gear member and inertia element 33, carried in concentric relation with respect to the axle 10. It will be apparent that the central gear element 30 and the annular inertia element 33 may on the one hand be revolved together and at the same speeds, with the interposed pinion elements 34 traveling at the same rate but remaining stationary with respect to their own axes, or that on the other hand the annular inertia element 33 can be caused to revolve about or overtravel the gear member 30, in which case the pinion elements 34 will at the same time be rotated about their respective axes in a direction corresponding to that of movement of the annular inertia element.

Each of the planetary pinion elements 34 has an extension 36 formed on the end thereof disposed adjacent the cover plate 25, which extension is provided with a slot adapted to receive a rod-shaped permanent magnet 38 having oppositely disposed north and south poles. The magnets 38 may be made of a magnetic alloy, such as "alnico." As is shown in Fig. 1, each of the magnets 38 may be held in place by means of a rivet 39. Referring to Fig. 2, it will be noted that the pinion elements 34 carrying the magnets 38 are spaced apart to allow the magnets to be held in a normal position in which the north pole of each magnet is disposed closely adjacent the south pole of the magnet next in line. It will be apparent that the associated magnets 38 are thus normally so arranged as to resist any relative movement between the gear element 30 and the inertia element 33 which would tend to turn the magnets out of alignment.

As additional means for biasing the inertia element 33 into the normal position with respect to the gear element 30, as shown in Fig. 2, there is provided a leaf spring 41, one end of which is riveted or otherwise secured to a bracket 42 carried by the gear element 30, and the other end of which extends into a recess 43 formed in the inertia element 33, the recess being so formed as to provide spaced knife edges 44 with which the adjacent end of the leaf spring may engage. The leaf spring 41 is preferably held loosely between the knife edges 44 so long as the magnets 38 remain in alignment as shown in Fig. 2. A radially disposed bar 46 is bolted or otherwise secured to the gear element 30 and extends outwardly between a pair of spaced stop lugs 47 and 48 carried by the inertia element 33, in order that movement in either direction of the inertia element with respect to the gear element may be limited, the extreme movement permitted being such as to bring each of the magnets 38 into a radial position, as represented in dotted lines in Fig. 2.

The cover plate 25 shown in Fig. 1 is adapted to support a circuit control means or electric contact mechanism, which includes a rotatable contact element 50 that is journaled on a pin 51 secured to the cover plate, and a pair of stationary contact elements 52 also secured to and suitably insulated from the cover plate. It will be understood that the contact element 50 may be insulated in any desired manner, as for example by providing an insulating bushing for the pin 51, although this is not shown in the drawing.

Referring to Fig. 2, it will be observed that the movable contact element 50 is provided with oppositely disposed, inwardly curved pole portions 54 and 55. The contact element 50 constitutes a strong permanent magnet, being preferably made of a magnetic alloy such as "alnico," so that the portions 55 and 54 thereof are opposite or north and south poles, respectively. A suitably insulated spring 57 may be secured to the central portion of the contact element 50 and to a post 58 carried by the cover plate 25 for normally maintaining the contact element in the position in which it is shown in Fig. 2. The stationary contact elements 52 are disposed at opposite sides of the spring 57, each of said elements being thus adapted for engagement by one of the opposite ends of the movable contact element 50 when that element is rotated in a corresponding direction about the pin 51.

In actual practice, when the rotary inertia device 12 is installed as part of a brake control system, not shown, the movable contact element 50 may be connected by suitable flexible conductor means to a branch of an electric control circuit, and the stationary contact elements 52 may be similarly connected to corresponding electrically actuated brake release means. The contact elements 52 may also, if desired, be connected to electrically actuated sanding apparatus of the type operative to sand the rail in advance of the vehicle wheels regardless of the direction in which the vehicle is traveling. Such an equipment involving circuits which might be adapted for control by my improved inertia device is illustrated and described in the U. S. Patent application of Joseph C. McCune, filed May 18, 1940, Serial No. 335,969.

*Operation*

In order to explain the operation of the improved rotary inertia device 12, it will be assumed that the wheel and axle assembly and the gear element 30 attached thereto are rotated in a clockwise direction, as viewed in Fig. 2, and that the inertia element 33 is rotated at the same speed, the interposed pinion elements 34 and bar magnets 38 being disposed in their normal alignment. At the same time the magnetic movable contact element 50 is maintained in the intermediate or normal position shown in Fig. 2, under the force exerted by the spring 57.

If an application of the brakes is now effected in the usual manner, so that the wheel and axle assembly and the gear element 30 are consequently retarded, the inertia responsive member 33 will tend to overrun the gear element, this tendency being resisted, in the preferred embodiment illustrated, by reason of the mutual attraction of the aligned bar magnets 38. If, however, the rate of retardation of the wheel and axle assembly exceeds a predetermined safe rate, or in other words if the associated wheel 10 begins to slip on the rail, the inertia torque of the revolving annular member 33 then becomes effective to overcome the resistance to displacement offered by the aligned bar magnets 38, whereupon the inertia element 33 overruns the gear element 30 until the lug 48 is brought into engagement with the bar 46, the several pinion elements 34 being meanwhile rotated so as to turn each of the magnets 38 through an angle approximating ninety degrees, each magnet being thereby disposed in the radial position indicated in dotted lines, with one of its poles pointed toward the center of the gear element 30. Assuming that the north pole of each of the magnets 38 is thus brought toward the center, as is indicated in Fig. 2, a magnetic field is thereby established for attracting the south pole while repelling the north pole of the magnetic contact element 50, which is consequently rotated about the pin 51 until brought into contact with the corresponding stationary contact 52. In the drawing, the portion 54 of the movable contact element 50 is represented as constituting the south pole, so that in this case the element will assume the position indicated in dotted lines, electrical contact being made with the stationary contact 52 at the right of the spring 57.

It should be noted that the operation of the rotary inertia device 12 as just explained is effected quickly and positively, the inertia responsive element 33 being adapted to shift relatively to the gear element 30 and to assume its position of maximum displacement without hesitation, as a result of the sudden diminution of magnetic attraction between the bar magnets 38 as they are turned out of alignment. At the same time, the leaf spring 41 becomes flexed upon engagement thereof with one of the knife edges 44 during the relative rotary movement of the inertia element 12 with respect to the driving gear element 30. It will thus be seen that the leaf spring 41 will exert a maximum force, tending to bring the inertia element 33 back into its normal alignment or position with respect to the gear element 30, when the two elements are disposed at the maximum angle of displacement.

It will be understood that, upon the engagement of the movable contact element 50 and the stationary contact element 52, the associated brake controlling equipment, not shown, is operated in the usual manner to effect a quick release of the brakes associated with the slipping wheel, so that the wheel is again enabled to resume a speed corresponding to that of the vehicle. When the slipping vehicle wheel ceases to decelerate and begins to accelerate back toward a speed corresponding to car speed, the leaf spring 41 is rendered effective to bring the inertia responsive element 33 back into its normal alignment with respect to the gear element 30, while the bar magnets 38 and associated pinion elements 34 are rotated to their orignal positions as already described. As the magnetic field is thus withdrawn beyond the range of effect on the movable contact element 50, that element is then returned to the position in which it is shown in Fig. 2 under the force of the coil spring 57, thus breaking the circuit through which the brake releasing mechanism has been energized.

It will be evident from the foregoing description that the inertia device 12 is also adapted to respond to deceleration of the associated vehicle wheel when rotating in a counterclockwise direction, the operation in this case producing the same result, namely quick release of the brakes and sanding of the rails in advance of the wheels in response to establishment of the appropriate control circuit. With the device as illustrated in Fig. 2, excessive deceleration of the gear element 30 in a counter-clockwise direction will thus cause the inertia responsive element 33 to overrun the gear element so that the interposed pinion elements 34 and bar magnets 38 are each rotated in a corresponding direction, the south poles of the several magnets thereby being brought toward the center. The north pole of the magnetic contact element 50 is thereby attracted outwardly, and the contact element will consequently rotate about the pin 51 until contact is made with the stationary contact element 52 at the left of the spring 57. It will thus be seen that the rotary ineria device 12 is constructed and arranged to select a control circuit corresponding to the direction of travel of the vehicle.

Although the improved rotary inertia responsive control device hereinbefore disclosed is a preferred embodiment of my invention, it should be understood that principal features thereof may be provided in a somewhat different construction if desired. The device may, for example, be adapted for operation by a flexible driving member or shaft driven by a car axle. It will also be apparent that the change of speed of rotation of the driving element of the combination, i. e., the gear element 30 in the drawing, required to cause the inertia responsive element to overrun may be controlled by adjusting the distance between the magnet bars secured to the interposed pinion elements. If the magnets are brought closer together, an increased rate of deceleration will be required to cause overrunning of the inertia responsive element with respect to the driving element. If the magnets are moved farther apart, a decreased rate of deceleration will be effective to produce the desired result.

It is not intended to limit the scope of the invention to the single embodiment described or otherwise than by the terms of the appended claims.

Having now described my invention, what I claim as new and desire to secure by Letters Patent, is:

1. An inertia responsive control mechanism comprising a rotary driving element, a rotary driven element mounted coaxially of said driving element and adapted for movement relative thereto under a torque caused by inertia, magnet means cooperative with said elements for effecting rotation of said driven element with said driving element and resisting relative movement between said two elements, and movably mounted control means constructed and arranged for operation in response to such relative movement of said driving element with respect to said driven element.

2. An inertia responsive control mechanism comprising a rotary driving element, a rotary driven element mounted coaxially on said driving element and arranged for movement relative thereto under a torque caused by inertia, magnet means cooperative with said element for effecting rotation of said driven element with said driving element and resisting relative movement between said two elements, said magnet means being operative under an inertia torque in excess of a predetermined value to withdraw the force opposing relative movement, and movably mounted control means constructed and arranged for operation in response to such relative movement of said driving element with respect to said driven element.

3. An inertia responsive control mechanism comprising a rotary driving element, a rotary driven element mounted coaxially on said driving element and arranged for movement relative thereto under a torque caused by inertia, magnet means cooperative with both of said elements for causing rotation of said driven element with said driving element and resisting relative movement between said two elements, said magnet means being operative under an inertia torque in excess of a predetermined value to withdraw the force opposing said relative movement, spring means operative to return said driven element into said definite alignment with said driving element after displacement thereof, and movably mounted control means constructed and arranged for operation in response to relative movement of said driving element and said driven element.

4. An inertia responsive control mechanism comprising a driving element, a driven element associated therewith and arranged for movement relative to said driving element under the force of inertia, magnet means operatively interposed between said driving and driven elements and normally operative to exert a force resisting relative movement between said two elements, said magnet means being operative under an inertia force in excess of a predetermined value to withdraw the force opposing said relative movement, and movably mounted control means constructed and arranged for operation in response to movement of said driven element with respect to said driving element.

5. An inertia responsive control mechanism comprising a rotary driving element, a rotary driven element having a free driving connection with said driving element and adapted to overrun said driving element under the force of inertia, magnetic means adapted to transmit torque from said driving element to said driven element and normally operative to resist any tendency of said driven element to overrun said driving element, means responsive to initial movement of said driven element relatively to said driving element for rendering said magnetic means inoperative to oppose such movement, and movably mounted control means constructed and arranged for operation in response to such relative movement between said driving and driven elements.

6. A rotary inertia device comprising a rotatable member, a rotary inertia element, magnetic means for normally providing a yieldable driving connection through which said inertia element is driven by said rotatable member, and control means operatively responsive to relative rotary movement between said member and said inertia element.

7. A rotary inertia device comprising a rotary member adapted to be rotated at different speeds, an annular inertia element disposed in concentric surrounding relation with respect to and rotatably carried by the said rotary member, a radially disposed leaf spring providing a resilient yielding driving connection between the rotary member and said inertia element and adapted to permit rotative movement of the inertia element with respect to the rotary member in opposite directions from a given normal position, means conditioned by magnetic force for also resisting relative movement between said inertia element and said rotary member, and switch means operated in response to the relative rotary movement between said rotary member and said inertia element.

8. A rotary inertia device for registering the rotative condition of a vehicle wheel, comprising a driving member rotatable with the vehicle wheel, an annular inertia responsive element arranged in concentric relation to said driving member, means for mounting the inertia element rotatably on said driving member and including a plurality of rotatable elements carried by the driving member in planetary relation thereto, a plurality of operatively arranged magnet elements controlled by said rotatable elements for providing a yieldable driving connection between the driving member and said inertia element, and control means actuated in response to relative rotary movement between the inertia element and the driving member.

9. An inertia responsive control device comprising a rotary driving element, a rotary inertia element mounted coaxially of said driving element, magnet means operatively associated with said driving element and said inertia element, stationary circuit controlling means, and magnetic actuator means therefor operable in response to projection of a magnetic field by said magnet means upon relative rotary movement of said inertia element with respect to said driving element.

10. A rotary inertia device for controlling acceleration or deceleration of an operating member, comprising a rotary driving element, a freely mounted inertia responsive driven element, a movable control member connected and arranged to react selectively to magnetic forces, and means normally effective to cause rotation of said driven element with said driving element and responsive to a change in the relative speeds of said driving element and said driven element for imposing a magnetic field on said control element corresponding to the direction of rotation.

11. A rotary device for detecting and controlling the rate of acceleration or deceleration of a rotating member, comprising a circular driving element operatively connected with said rotating member, an annular driven element disposed concentrically around said driving element, a plurality of spaced rotatable members interposed between and in cooperation relative with said driving and driven elements, yieldable means for urging said driven element to a normal position with respect to said driving element, said means being arranged to yield to permit rotary displacement of said driven element from said normal position upon an excessive change in the rate of acceleration or deceleration, a stationary control mechanism including a magnetically actuated member, and means for subjecting said member to a magnetic field for actuating said control mechanism in response to displacement of said driven element relatively to said driving element.

12. An inertia responsive control device for detecting and controlling the rate of acceleration or deceleration of a rotating member, comprising a circular driving element operatively connected with said rotating member, an annular driven member disposed concentrically around said driving element, a plurality of spaced rotatable members interposed between and in cooperative relation with said driving and driven elements, a plurality of magnet elements mounted on said rotatable members, respectively, said magnet elements being normally disposed in pole to pole alignment for exerting predetermined magnetic resistance to displacement of said driven element out of a normal position with respect to said driving element, means for limiting such displacement of the driven element to an angle corresponding with rotation of each of said magnet elements by the associated rotatable member to a radial position under the force of inertia on said driven elements, and magnetically operative circuit control means constructed and arranged to respond to the field projected by said magnet elements when in said radial positions.

13. In an inertia responsive control device for detecting and controlling the rate of acceleration or deceleration of a rotating member, in combination, a circular driving element operatively connected with said rotating member, an annular driven element disposed concentrically around said driving element, a plurality of spaced pinion members interposed between and in cooperative relation with said driving and driven elements, yieldable means for resisting displacement of said driven element out of a normal position with respect to said driving element, a plurality of magnet elements mounted in fixed relation with said pinion members, respectively, said magnet elements being normally disposed in pole to pole alignment, means for limiting displacement of the driven elements relatively to the driving element to an angle corresponding with rotation of each of said magnet elements by the associated pinion member to a radial position, and magnetically operative circuit control means constructed and arranged to respond to the magnetic field projected by said magnet elements when disposed in radial positions.

14. In an inertia responsive control device for detecting and controlling the rate of acceleration or deceleration of a rotating member, in combination, a circular driving element operatively connected with said rotating member, an annular driven element disposed concentrically around said driving element, a plurality of spaced pinion members interposed between and in cooperative relation with said driving and driven elements, yieldable means for resisting displacement of said driven element out of a normal position with respect to said driving element, a plurality of magnet elements mounted in fixed relation with said pinion members, respectively, said magnet elements being normally disposed in pole to pole alignment, means for limiting displacement of the driven element relatively to the driving element to an angle corresponding with rotation of each of said magnetic elements by the associated pinion member to a radial position, and circuit selector means associated with said rotary element and including a pivotally mounted actuator magnet element constructed and arranged for movement to different positions under the magnetic force exerted by said magnet elements when disposed in said radial positions, the positioning of said actuator magnet element being determined by the direction of rotation of said driving element.

15. A rotary inertia device comprising a rotary member adapted to be rotated at different speeds, an inertia responsive element disposed in concentric relation with respect to said rotary member and mounted for rotation independently thereof, a plurality of permanent magnet elements associated with said rotary member and said inertia element, said magnet elements being constructed and arranged to provide a yielding driving connection between the rotary member and the inertia element, and contact means operable in response to relative rotary movement of said inertia element with respect to the rotary member in opposition to the force exerted by said magnet elements.

GEORGE K. NEWELL.